(12) United States Patent
Bensussan et al.

(10) Patent No.: US 8,398,330 B2
(45) Date of Patent: Mar. 19, 2013

(54) CONNECTING ASSEMBLY FOR TOOLS AND HANDLES

(75) Inventors: Bernard L. Bensussan, Monroe, CT (US); Anthony Sgroi, Wallingford, CT (US); Paul Adams, Monroe, CT (US)

(73) Assignee: Unger Marketing International, LLC, Bridgeport, CT (US)

( * ) Notice: Subject to any disclaimer, the term of this patent is extended or adjusted under 35 U.S.C. 154(b) by 0 days.

(21) Appl. No.: 12/838,011

(22) Filed: Jul. 16, 2010

(65) Prior Publication Data
US 2011/0164919 A1 Jul. 7, 2011

Related U.S. Application Data

(63) Continuation-in-part of application No. 12/505,373, filed on Jul. 17, 2009, now abandoned.

(51) Int. Cl.
*B25G 3/10* (2006.01)

(52) U.S. Cl. .................. 403/374.4; 81/489; 16/429

(58) Field of Classification Search .................. 81/489, 81/491; 16/429; 15/144.3, 144.4; 403/109.4, 403/109.5, 374.3, 374.4
See application file for complete search history.

(56) References Cited

U.S. PATENT DOCUMENTS

| | | | |
|---|---|---|---|
| 2,090,412 A | 8/1937 | Geiger |
| 4,378,172 A | 3/1983 | Groschupp |
| 4,524,484 A | 6/1985 | Graham |
| 4,541,139 A | 9/1985 | Jones et al. |
| 4,642,837 A | 2/1987 | Nichols et al. |
| 4,922,577 A | 5/1990 | Unger |
| 5,037,235 A | 8/1991 | Aquilina |
| 5,161,278 A | 11/1992 | Tomm |
| 5,172,447 A | 12/1992 | Tomm |
| 5,261,434 A | 11/1993 | Fodero |
| 5,609,501 A | 3/1997 | McMills et al. |
| 5,649,780 A | 7/1997 | Schall |
| 5,924,816 A | 7/1999 | Schuele |
| 5,983,455 A | 11/1999 | Polzin |
| 6,106,159 A | 8/2000 | Caplan et al. |
| 6,332,734 B1 | 12/2001 | Hebert |
| 6,701,578 B1 | 3/2004 | Lu |
| 7,065,824 B2 | 6/2006 | Petner |
| 7,322,135 B2 | 1/2008 | Gulati |
| D564,161 S | 3/2008 | Talesfore et al. |
| 7,563,993 B2 | 7/2009 | Drotleff |
| 7,618,206 B2 | 11/2009 | Sacks |
| D627,118 S | 11/2010 | Bensussan et al. |

OTHER PUBLICATIONS

International Search Report and Written Opinion dated Sep. 9, 2010 from corresponding International Application No. PCT/US2010/042448.
International Preliminary Report on Patentability dated Jan. 26, 2012 from International Application No. PCT/US2010/042448.
Office Action dated May 4, 2011 in U.S. Appl. No. 12/505,373.

*Primary Examiner* — Joshua Kennedy
(74) *Attorney, Agent, or Firm* — Ohlandt, Greeley, Ruggiero & Perle, L.L.P.

(57) ABSTRACT

A connecting assembly is provided that includes a tool receiving portion, a handle receiving portion, a tightening member, a first open region, and a second open region. The handle receiving portion has a first engaging portion, a clamping portion with a first cam, and a longitudinal axis. The tightening member has a second cam and a second engaging portion. The second engaging portion is engagable with the first engaging portion so that the tightening member moves to cause the first and second cams to interact with one another biasing the clamping portion in a desired direction. The first open region is defined at the first engaging portion, while the second open region is defined at the clamping portion so that the open regions are in fluid communication with one another.

20 Claims, 17 Drawing Sheets

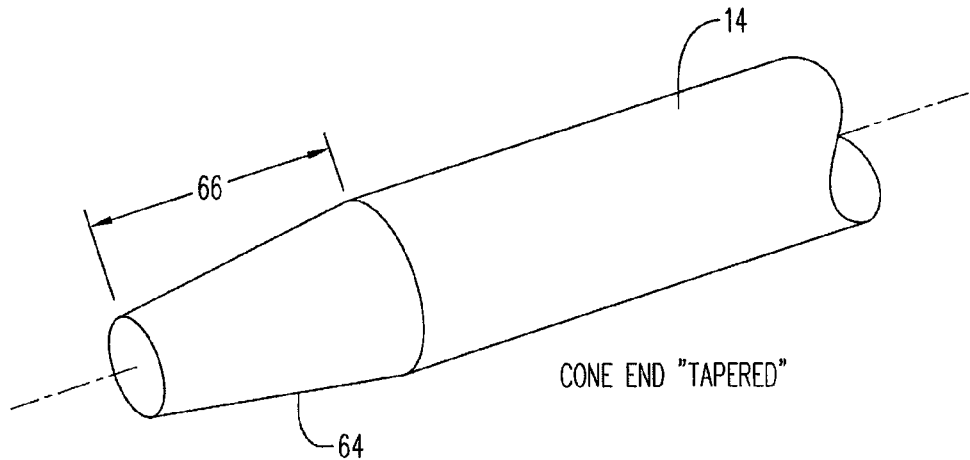
FIG. 1A  CONE END "TAPERED"
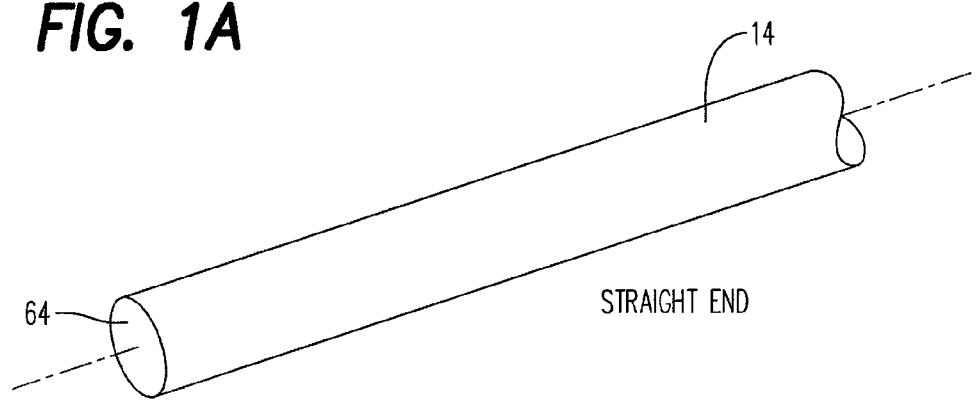
FIG. 1B  STRAIGHT END
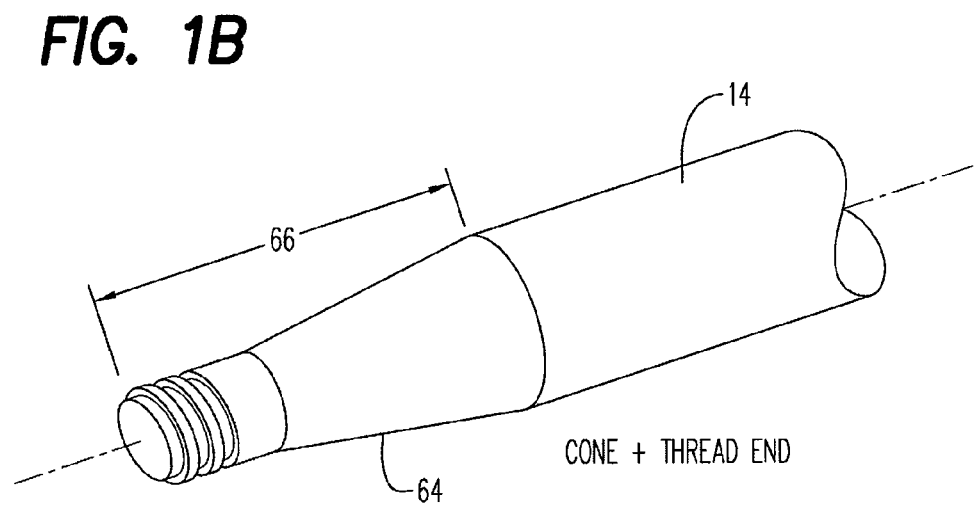
FIG. 1C  CONE + THREAD END

CONNECTING ASSEMBLY FOR TOOLS AND HANDLES

CROSS REFERENCE TO RELATED APPLICATIONS

This application is a continuation-in-part of U.S. application Ser. No. 12/505,373 filed Jul. 17, 2009, now pending, the entire contents of which are incorporated herein by reference.

BACKGROUND OF THE INVENTION

1. Field of the Invention

The present disclosure is related to connecting assemblies for connecting tools and handles. More particularly, the present disclosure is related to a connecting assembly that removably connects a handle to a tool such as, but not limited to a cleaning implement.

2. Description of Related Art

Extension poles or handles (hereinafter "handles") have been used to extend the reach of a variety of tools and implements (hereinafter "tools"). For example, handles are used to extend the reach of brooms, brushes, floor squeegees, mop heads, drywall sanding implements, light bulb removing implements, pool skimming attachments, window washing implements, and many others. Typically, the tool and the handle are releasably connectable to one another so that the tool can be used with or without the handle and/or so that the handle can be used with other tools.

Unfortunately, the prior art connecting assemblies for removably connecting tools and handles have proven difficult to use, difficult to clean, and unreliable for extended cycles of connecting and disconnecting. Additionally, the prior art connecting assemblies are typically configured to work with only one type of handle, such as a handle with a threaded end, which requires the user to buy handles specific for that tool.

Accordingly, it has been determined by the present disclosure that there is a continuing need for connecting assemblies that alleviate, mitigate, and/or overcome one or more of the aforementioned and other deleterious effects and deficiencies of prior art devices.

BRIEF SUMMARY OF THE INVENTION

A connecting assembly is provided that includes a tool receiving portion, a handle receiving portion, a tightening member, a first open region, and a second open region. The handle receiving portion has a first engaging portion, a clamping portion with a first cam, and a longitudinal axis. The tightening member has a second cam and a second engaging portion. The second engaging portion is engagable with the first engaging portion so that the tightening member moves to cause the first and second cams to interact with one another biasing the clamping portion in a desired direction. The first open region is defined at the first engaging portion, while the second open region is defined at the clamping portion so that the open regions are in fluid communication with one another.

A connecting assembly is provided that includes a tool receiving portion, a handle receiving portion, and a tightening member. The handle receiving portion has a first engaging portion, a clamping portion, and an open end. The tightening member has a second engaging portion engagable with the first engaging portion. The clamping portion at least one clamping finger with a free end and a hinged end. The hinged end is proximate the open end and the free end is remote from the open end.

A connecting assembly is also provided that includes a tool receiving portion, a handle receiving portion, and a tightening member. The handle receiving portion has a first threaded portion, a clamping portion, and a longitudinal axis. The tightening member has a second threaded portion threadably engagable with the first threaded portion. The first threaded portion includes a plurality of threaded regions having a first open region between each of the plurality of threaded regions. The clamping portion has a plurality of clamping fingers with a second open region between each of the plurality of clamping fingers. The plurality of clamping fingers correspond in number to the plurality of threaded regions. The first threaded and clamping portions are on the handle receiving portion so that the threaded regions and the clamping fingers are aligned with one another along the longitudinal axis and so that the first and second open regions are aligned with one another along the longitudinal axis.

A connecting assembly is also provided that includes a tool receiving portion, a handle receiving portion, and a tightening member. The handle receiving portion has a first threaded portion, a clamping portion, an open end, and an upper guide structure at the open end. The tightening member has a second threaded portion threadably engagable with the first threaded portion. The clamping portion has a plurality of clamping fingers, each clamping finger having a free end and a hinged end, where the hinged end is proximate the open end and the free end is remote from the open end.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIGS. 1a through 1e are front isometric views of exemplary embodiments of handles that find use with the connecting assembly of FIG. 1;

DETAILED DESCRIPTION OF THE INVENTION

Figure 1:
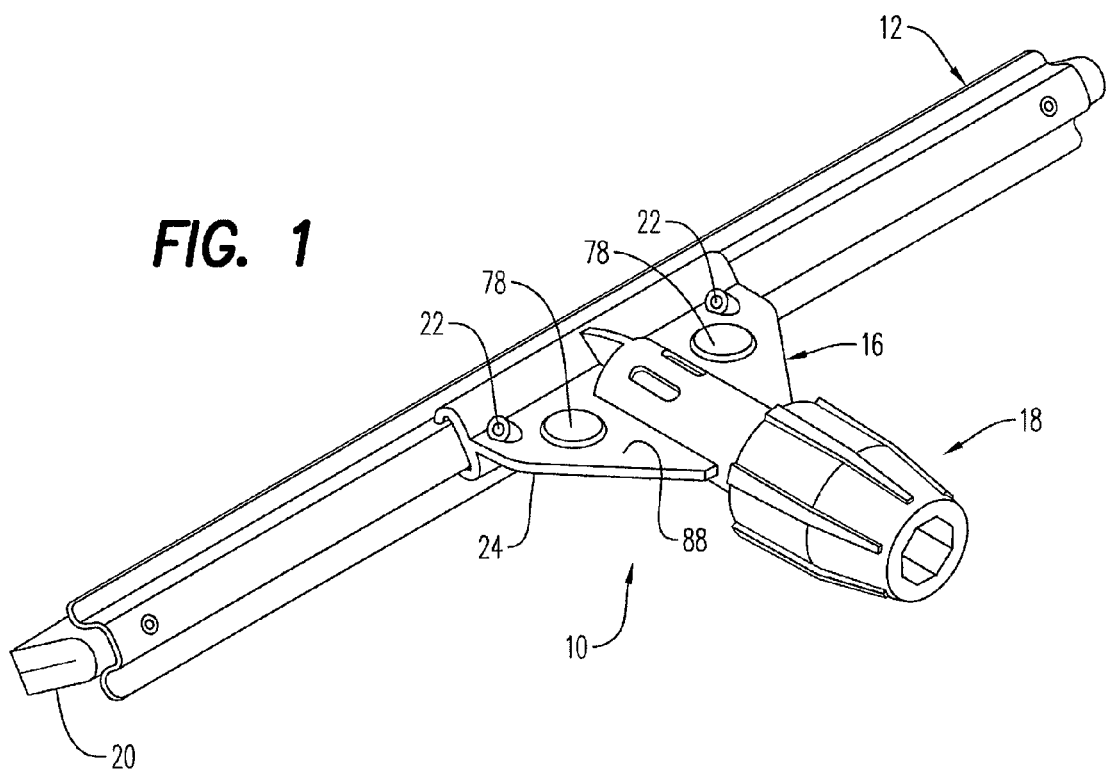
FIG. 1 is a front isometric view of a connecting assembly according to an exemplary embodiment of the present disclosure.
Figure 1D:
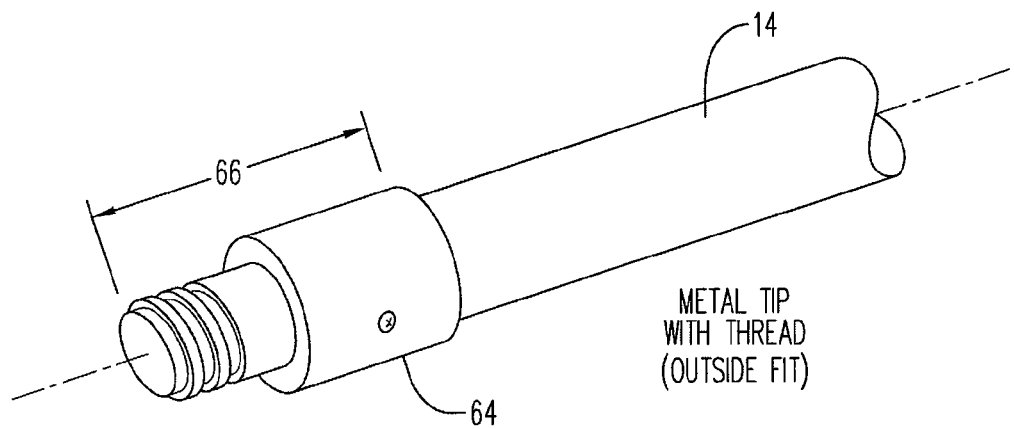
Figure 1E:
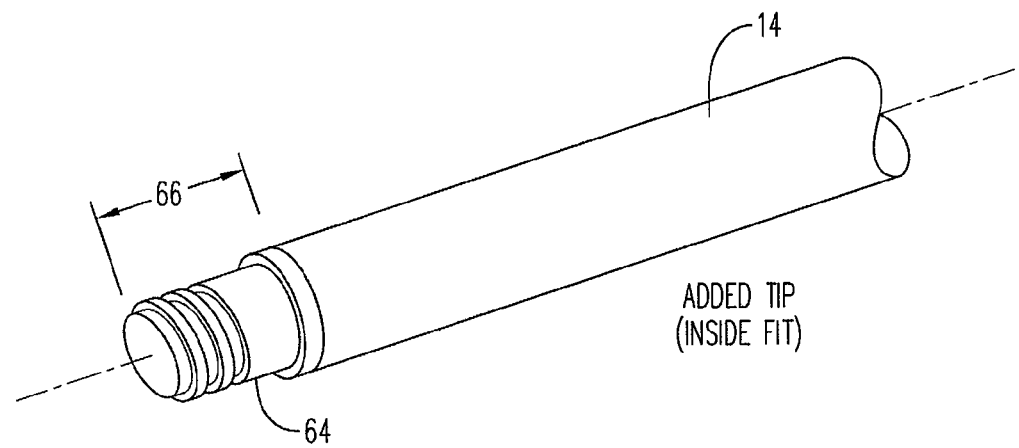
Figure 2:
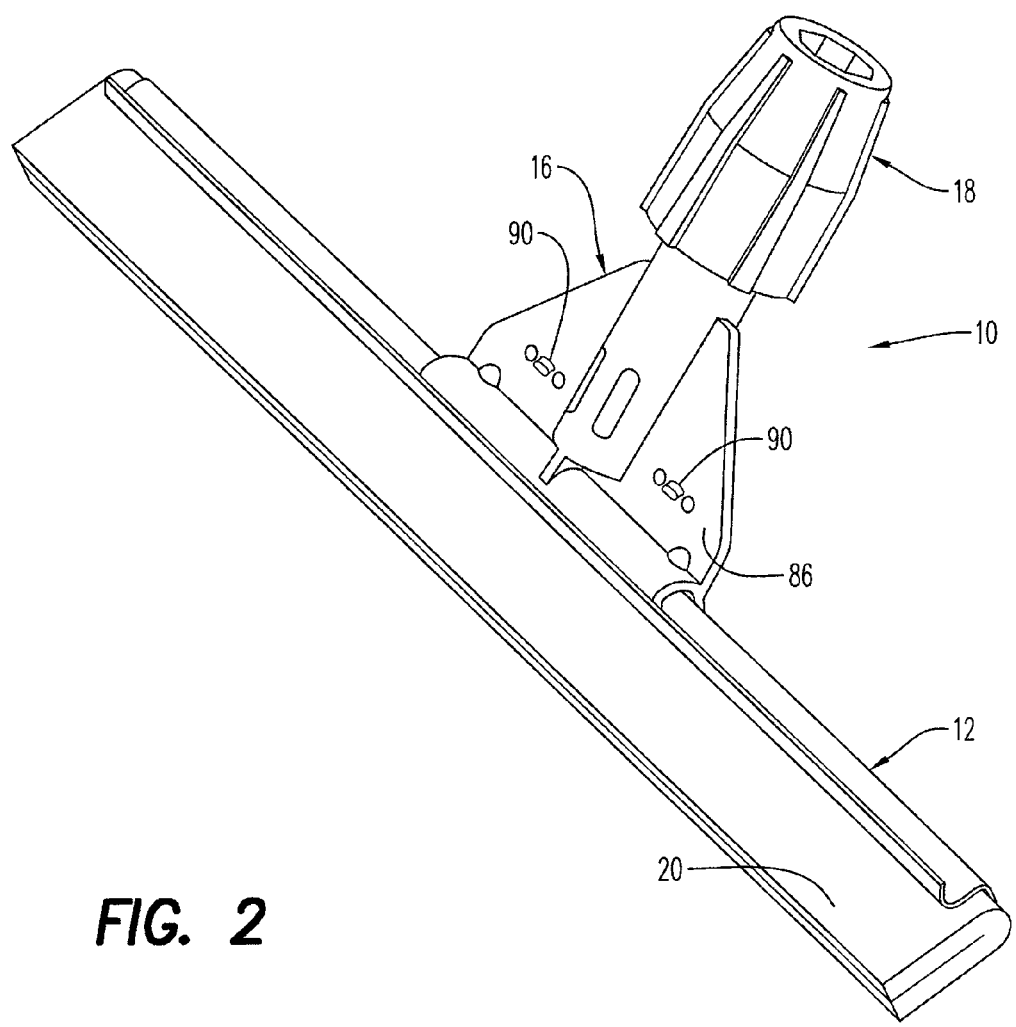
FIG. 2 is a rear isometric view of the connecting assembly of FIG. 1.
Figure 3:
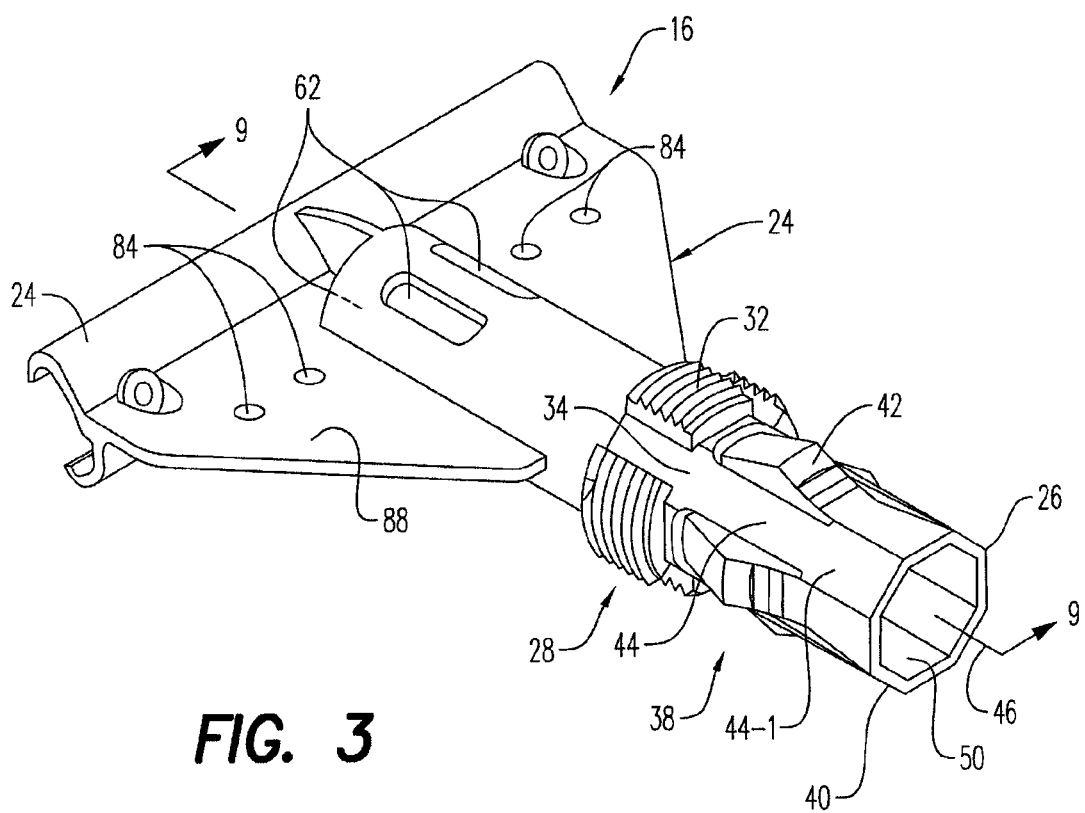
FIG. 3 is a front isometric view of an exemplary embodiment of a socket connection according to the present disclosure for use in the connection assembly of FIG. 1.
Figure 4:
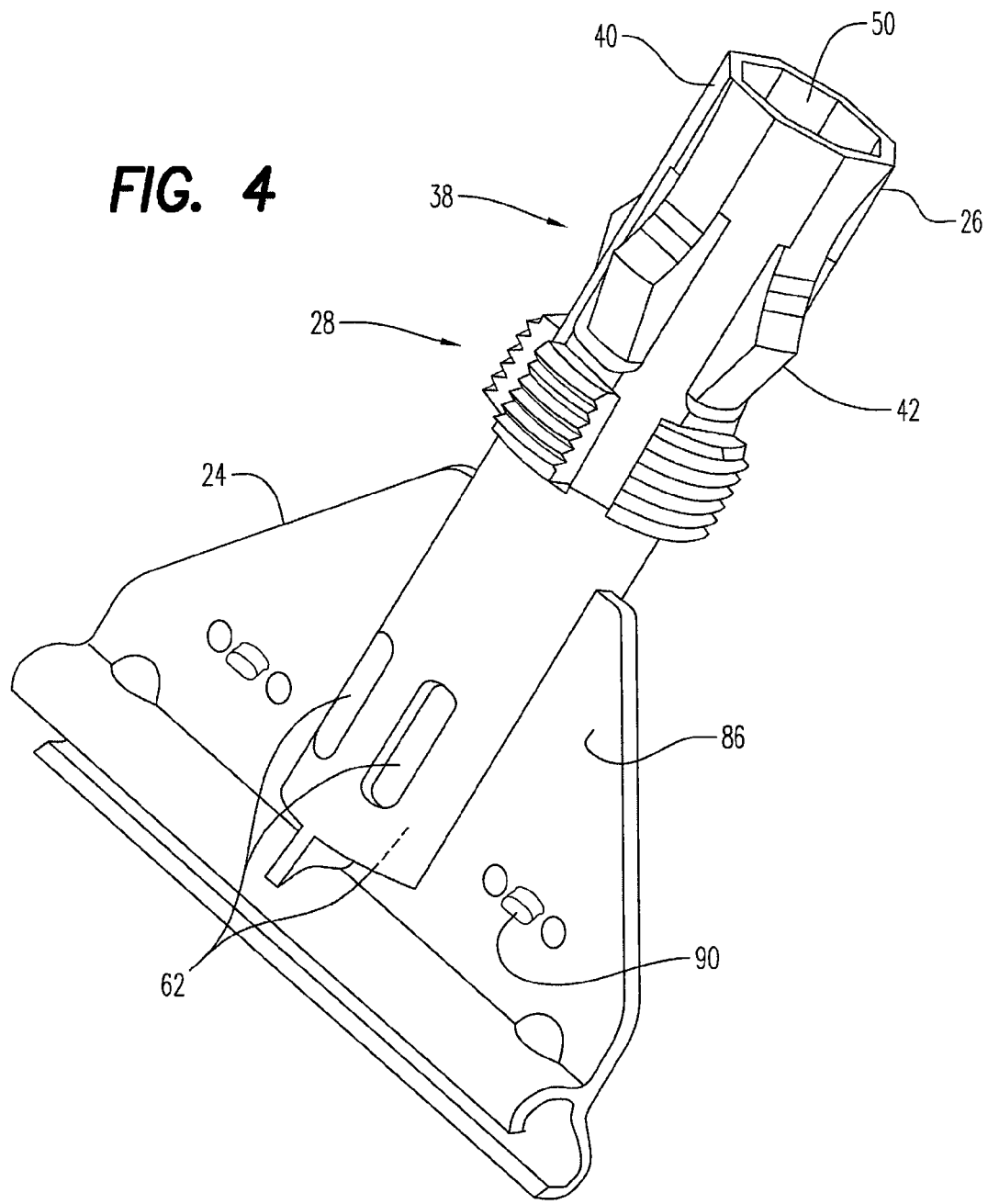
FIG. 4 is a rear isometric view of the socket connection of FIG. 3.
Figure 5:
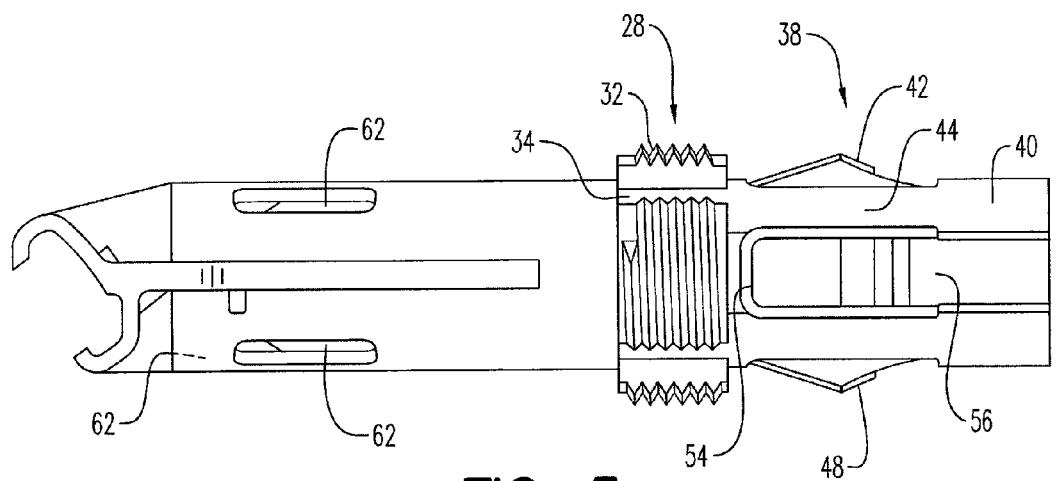
FIG. 5 is a first side view of the socket connection of FIG. 3.

Referring to the drawings and in particular to FIGS. 1 through 2, a connecting assembly according to the present disclosure is shown and is generally referred to by reference numeral 10. Connecting assembly 10 is configured to secure a tool 12 to a handle 14 with a simple structure that holds the handle in the connecting assembly so that the reach of the tool is extended. Connecting assembly 10 includes a socket connection 16 and a tightening member 18 that cooperate to hold handle 14 in the assembly.

Advantageously, connecting assembly 10 is configured as a universal connecting assembly that can find use with handles 14 having a variety of sizes and configurations such as those shown in FIGS. 1a through 1e, while ensuring that the handle is held to the connecting assembly.

Additionally, connecting assembly 10 is advantageously configured with a "flow through" design so that it can be easily cleaned, allowing debris and other particles, which may collect in the connecting assembly, to be easily flushed from the assembly. Further, connecting assembly 10 is also advantageously configured so that any "creep" in its material from being left for extended periods of time in a second position (FIG. 11b) with a first handle 14 does not prevent insertion of a second handle that has a larger outer dimension than the first handle when tightening member 18 has been loosened.

Connecting assembly 10 is shown by way of example only having tool 12 configured as a squeegee 20 for wiping debris such as fluids and/or solid materials from a floor, window, counter or other surface to be cleaned. Of course, it is contemplated by the present disclosure for connecting assembly 10 to find use with any tool 12 whose reach is desired to be extended by handle 14. For example, it is contemplated by the present disclosure for connecting assembly 10 to find use with tool 12 such as, but not limited to, brooms, brushes, floor squeegees, wet or dry dusting mops, drywall sanding implements, light bulb removing implements, pool skimming attachments, window washing implements, tree saws, painting rollers, painting tools, construction tools, and many others.

Connecting assembly 10 is also shown by way of example only having tool 12 secured to socket connection 16 by one or more mechanical fasteners 22 such as rivets or bolts. Of course, it is contemplated by the present disclosure for socket connection 16 to be mated with tool 12 in any desired manner. For example, socket connection 16 can, in some embodiments, be integrally formed with tool 12. In other embodiments, socket connection 16 can be configured to removably receive tool 12.

Handle 14 can have any desired length and be formed of any desired material sufficient to withstand the stresses induced during use of tool 12. In some embodiments, handle 14 can be a collapsible extension handle. While in other embodiments, handle 14 can be a wooden, metallic or polymeric handle of a single length, have a pivot, and/or can be a flexible handle. Further, handle 14 can have any desired cross-section such as circular or polygonal.

The operation and construction of socket connection 16 is described in more detail with simultaneous reference to FIGS. 3 through 12. Socket connection 16 includes a tool receiving portion 24 and a handle receiving portion 26.

Socket connection 16 is formed of any material suitable to withstand the stress imparted to the socket connection during use. Socket connection 16 or any portion thereof is formed of molded polymeric material such as, but not limited to, polypropylene, glass filled polypropylene, polyamide, glass filled polyamide, acetal, glass filled acetal, and others, such that tool and handle receiving portions 24, 26 are integrally formed with one another. Of course, it is contemplated by the present disclosure for socket connection 16 or any portion thereof to be die cast of other materials such, as but not limited to, such as but not limited to, zinc, aluminum, magnesium, copper, tin, and alloys thereof.

While tool and handle receiving portions 24, 26 are described above as being integrally formed with one another, it is also contemplated for socket connection 16 to be formed such that tool and handle receiving portions 24, 26 are separately formed of any desired material and are secured to one another.

In some embodiments where socket connection 16 is formed of molded polymers, the socket connection can include one or more anti-microbial components dispersed within and/or coated on the material from which the socket connection is formed. Examples of suitable antimicrobial components contemplated for use by the present disclosure include copper, silver, alloys of copper, alloys of silver, and combinations of any of the foregoing.

Tool receiving portion 24 can have any shape suitable to secure tool 12 to socket connection 16 and suitable to withstand the stress imparted to the socket connection during use.

Figure 14:
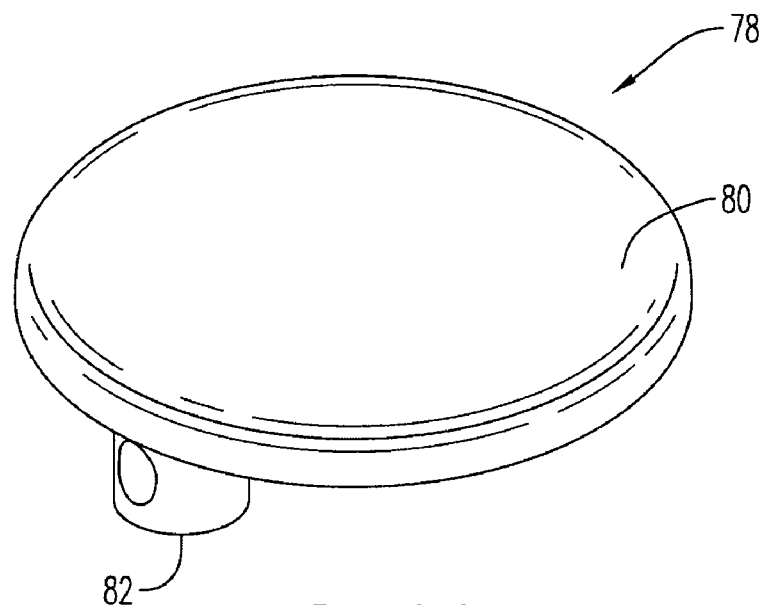
FIG. 14 is a front isometric view of a coded marking device according to the present disclosure for use in the connection assembly of FIG. 1.
Figure 15:
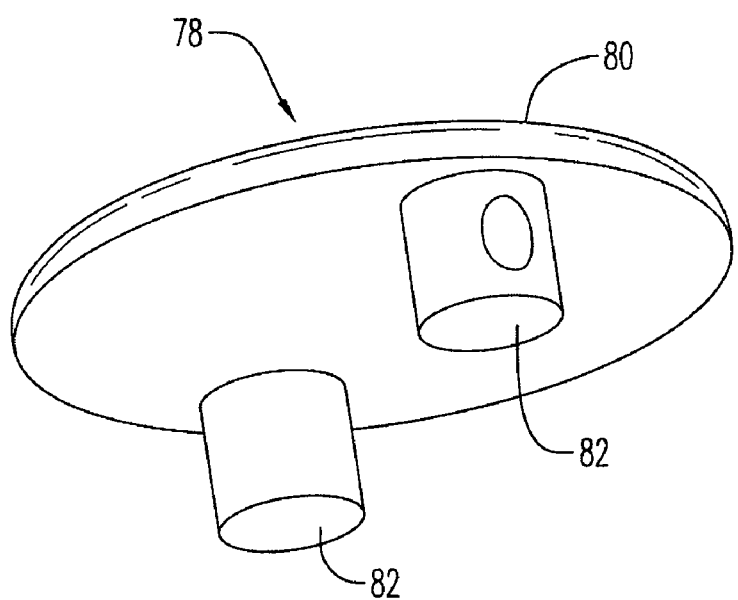
FIG. 15 is a rear isometric view of an exemplary embodiment of the coded marking device of FIG. 14.

Handle receiving portion 26 includes a threaded portion 28 configured to threadably engage a corresponding threaded portion 30 (FIGS. 11 and 14) of tightening member 18. Threaded portion 28 includes one or more threaded regions 32 and one or more first open regions 34 defined therein. Threaded regions 32 each include threads 36 that mate with threaded portion 30 of tightening member 18.

Handle receiving portion 26 also includes a clamping portion 38, which cooperates with tightening member 18 to form a clamped connection to handle 14. Handle receiving portion 26 includes one or more clamping fingers 42 and one or more second open regions 44.

It should be recognized that socket connection 16 is disclosed above by way of example having handle receiving portion 26 and threaded portion 28 unitarily formed with one another. Of course, it is contemplated by the present disclosure for handle receiving portion 26 and threaded portion 28 to be separately formed, but secured to one another in any desired manner.

Handle receiving portion 26 further includes an upper guide structure 40 at its open end 50. Structure 40 is supported by handle receiving portion 26 in the location where second open regions 44 are defined. Here, a web 44-1 of handle receiving portion 26 extends above fingers 42 to support structure 40.

Structure 40 advantageously has been found to assist in guiding handle 14 into socket connection 16. Further, structure 40 limits the maximum side-to-side movement of handle 14 within socket connection 16 at least at the open end 50 of the socket connection. More particularly, during use, the force applied to handle 14 can act to rotate handle about an axis perpendicular to axis 46 by flexing fingers 42. This rotation is limited by the abutment of handle 14 against structure 40, which limits the amount of deflection of fingers 42 and, thus, the amount of stress induced in the fingers.

Figure 6:
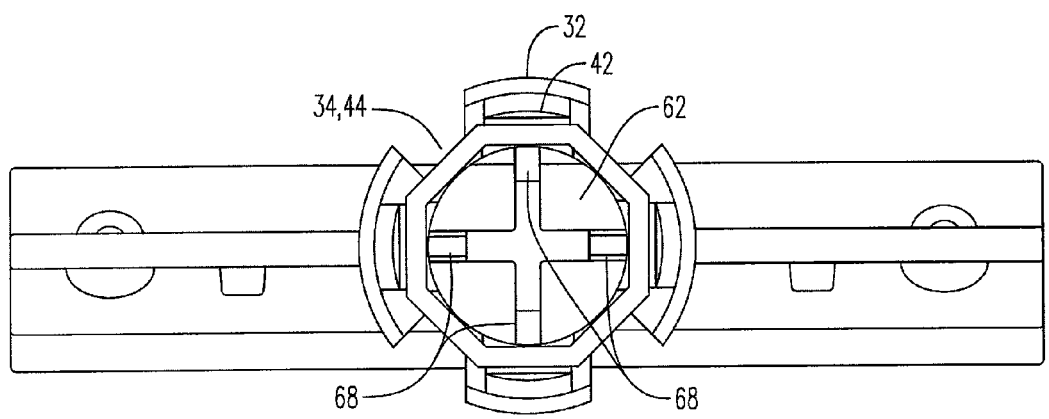
FIG. 6 is an end view of the socket connection of FIG. 3.

Threaded and clamping portions 28, 38 are disposed on socket connection 16 so that threaded regions 32 and clamping fingers 42 are aligned with one another along a longitudinal axis 46 of the socket connection and so that first and second open regions 34, 44 are aligned with one another along the longitudinal axis as best seen in FIG. 6.

It has been determined by the present disclosure that the alignment of first and second open regions 34, 44 provides a passageway for cleaning fluids between tightening member 18 and socket connection 16, which allows particles and debris that may become entrained between the tightening member and socket connection to be easily flushed or swept away. In this manner, connecting assembly 10 provides an easy to clean device.

While shown in the exemplary embodiment with first and second open regions 34, 44 aligned with one another along the longitudinal axis, it is also contemplated by the present disclosure for first and second open regions 34, 44 to be radially offset from one another but in fluid communication with one another to define the passageway for cleaning fluids between tightening member 18 and socket connection 16 to allow particles and debris that may become entrained between the tightening member and socket connection to be easily flushed or swept away.

Handle receiving portion 26 includes an open end 50 defining an inner conduit 52, which receives handle 14 therein. Handle receiving portion 26, at least in the region of open end 50, threaded portion 28, and clamping portion 38, has a generally polygonal shape.

The polygonal shape provides a flat surface for the formation of clamping fingers 42. More particularly, clamping fingers 42 have a free end 54 and a hinged end 56.

Free end 54 is remote from open end 50 so that clamping fingers 42 can be flexed or biased radially inward towards handle 14 about hinged end 56 under the influence of tightening member 18.

More specifically, clamping fingers 42 have an outer cam surface 48 that interacts with tightening member 18 as the tightening member is threaded onto socket connection 16 to cause the clamping fingers to flex or bias radially inward towards handle 14 about hinged end 56 as shown in FIG. 11.

Socket connection 16 is disclosed by way of example having tightening member 18 threadably secured onto the socket connection. However, it is contemplated by the present disclosure for the tightening member and the socket connection to be releasably joined in any manner sufficient to cause outer cam surface 48 to interact with the tightening member as the tightening member moves with respect to the socket connection, causing the clamping fingers to flex or bias radially inward towards handle 14.

For example, tightening member 18 and socket connection 16 can be secured to one another via a threaded connection, a ratchet connection, a colleted connection, or an over center latching connection provided that the connection releasably secures the components to one another while moving the tightening member 18 along axis 46 with respect to socket connection 16. In these embodiments, threaded regions 32 would correspond to the appropriate connection type. Where tightening member 18 and socket connection 16 are secured to one another via a threaded connection, threaded regions 32 and threaded portion 30 comprise threads. However, where tightening member 18 and socket connection 16 are secured to one another via a ratcheted connection, threaded regions 32 and threaded portion 30 are ratchets and pawls. Where tightening member 18 and socket connection 16 are secured to one another via a colleted connection or an over center latching connection, threaded regions 32 and threaded portion 30 are sliding support surfaces.

Figure 10:
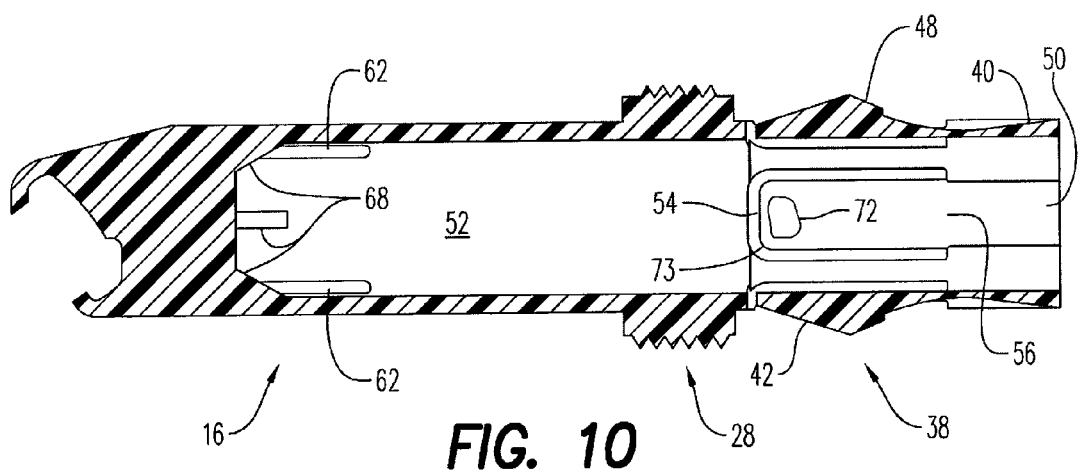
FIG. 10 is a side view of the socket connection of FIG. 9.
Figure 11A:
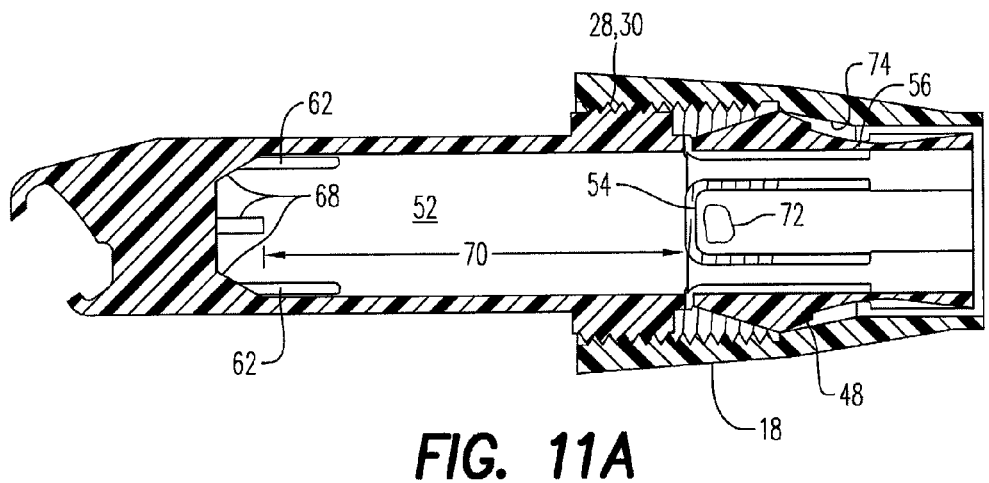
FIG. 11a is a view of the socket connection of FIG. 10 having the tightening member in a first position.
Figure 11B:
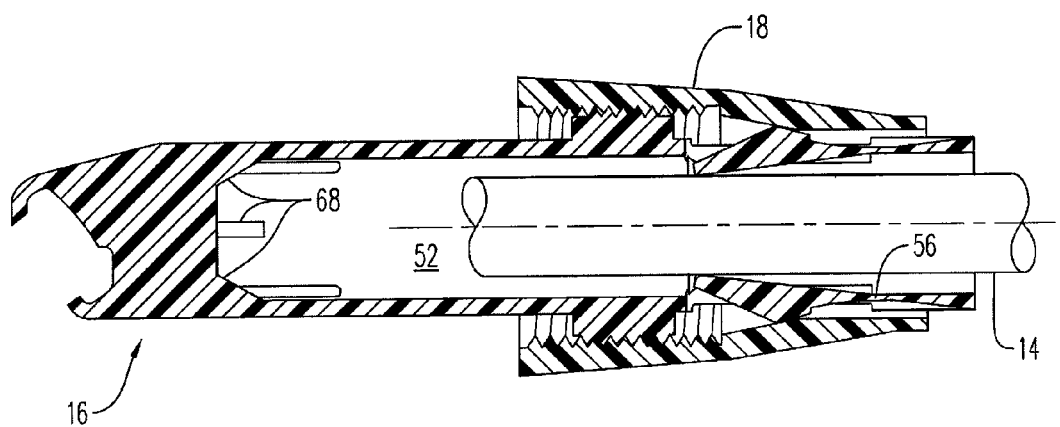
FIG. 11b is a view of the socket connection of FIG. 10 having the tightening member in a second position.

In this manner, free end 54 contacts handle 14 when tightening member 18 is tightened to a locked or clamped position, forming a clamping connection between socket connection 16 and the handle. Free end 54 can include one or more friction elements 72 formed thereon for increasing the friction induced between fingers 42 and handle 14 as shown in FIGS. 10, 11a, and 11b. Friction elements 72 can include soft durometer polymeric material, abrasive materials, sharp edges or features, and others.

Finger 42 can, in some embodiments, include a chamfer 73 at the end of and/or on an inner cam surface 58 of the finger as shown in FIG. 11a. Chamfer 73 is configured to interact with an end feature 64 of handle 14 so that the end feature does catch on the fingers 42 to prevent removal of the handle.

Tightening member 18 can be tightened to or loosened from socket connection 16. For example, socket connection 16 is shown in FIG. 11a having tightening member 18 in a first position and in FIG. 11b in a second position. In the first position, socket connection 16 is in an open or unclamped position. Here, the tightening member 18 is not biasing clamping fingers 42 radially inward. In the second position, socket connection 16 is in a closed or clamped position. Here, the tightening member 18 is biasing clamping fingers 42 radially inward to clamp handle 14 in socket connection 16.

Upon the return of tightening member to the second position, the natural elasticity or resilience of socket connection 16 returns clamping fingers 42 to the normal or open position shown in FIG. 11a or a position slight inward of the open position due to "creep", which is described in more detail below.

Outer cam surface 48 can have any desired profile and/or location on clamping fingers 42 sufficient to cooperate with tightening member 18 to bias the clamping fingers inward.

It has been observed by the inventors of the present disclosure that connecting assembly 10 is often stored and/or used for long periods of time in a locked or clamped position, namely where tightening member 18 is threadably engaged with socket connection 16 so that clamping fingers 42 are clamped onto handle 14 due to the influence of the tightening member. In this locked or clamped state, it has been determined by the present disclosure that clamping fingers 42 can become set in an inwardly biased position.

Without wishing to be bound by any particular theory, it is believed that the setting of clamping fingers 42 to the inwardly biased position is due to "creep" in the materials used to form socket connection 16. As used herein, the term "creep" describes the tendency of the material of socket connection 16 to slowly move or deform permanently under the long term exposure to levels of stress that are below the yield strength of the material. Since connecting assembly 10 is often stored in closets, cabinets, and other poorly ventilated areas, it is has been determined that the heat that connecting assembly 10 is often exposed during storage can accelerate the creep of clamping fingers 42. The creep of clamping fingers 42 has been found to be particularly prevalent when socket connection 16 is formed of molded polymer as in some embodiments of the present disclosure.

Under the influence of creep, clamping fingers 42 can become deformed such that the fingers remain inwardly biased into inner conduit 52 of socket connection 16 even after tightening member 18 has been loosened to the first position of FIG. 11a.

Advantageously, socket connection 16 includes clamping fingers 42 where free end 54 is remote from open end 50 and hinged end 56 is proximate the open end. In addition, clamping fingers 42 can include an inner cam surface 58 within inner conduit 52. Accordingly, during insertion of handle 14 into open end 50 of socket connection 16, the handle contacts inner cam surface 58 before contacting free end 54. In this manner, the interaction of handle 14 and inner cam surface 58 overcomes the elastic force of clamping fingers 42 to bias or flex the clamping fingers radially outwards so that socket connection 16 remains able to accommodate handles of differing diameters regardless of the existence of creep in the socket connection.

Moreover, it has surprisingly been determined by the present disclosure that connecting assembly 10 can function as a quick-disconnect device due, at least in part, to locating free end 54 remote from open end 50 and hinged end 56 proximate the open end. More specifically, it has been determined that tightening member 18 can be tightened to a predetermined torque to secure handle 14 within socket connection 16. Here, handle 14 can be removed from and placed back into socket connection 16 without loosening or tightening the tightening member 18. Rather, the predetermined torque on tightening member 18 can secure handle 14 in socket connection 16 to a degree sufficient for the normal use of tool 12, but insufficient to retain the handle in the socket connection upon application of a force along axis 46 of the handle.

Clamping fingers 42 are defined in the flat surface of socket connection 16 by way of openings 60. In this manner, hinged end 56 is, preferably, formed at a flat surface of handle receiving portion 26. Again, without wishing to be bound by any particular theory, it is believed that formation of hinged end 56 at a flat surface of the generally polygonal shape of handle receiving portion 26 reduces stresses on fingers 42 due to flexing and that this reduction of stress also reduces the "creep".

It should be recognized that clamping portion 38 is disclosed above by way of example having clamping fingers 42 unitarily formed thereon. However, it is also contemplated by the present disclosure for clamping fingers 42 to be separate from clamping portion 38, but hingedly secured to the clamping portion at hinged end 56. In this embodiment, clamping fingers 42 can be formed of a different material as that of the remaining portions of clamping portion 38. For example, clamping portion 38 can be formed of molded polymeric material, while clamping fingers 42 are formed of die cast metallic material to further mitigate instances of creep from the clamping fingers.

Figure 7:
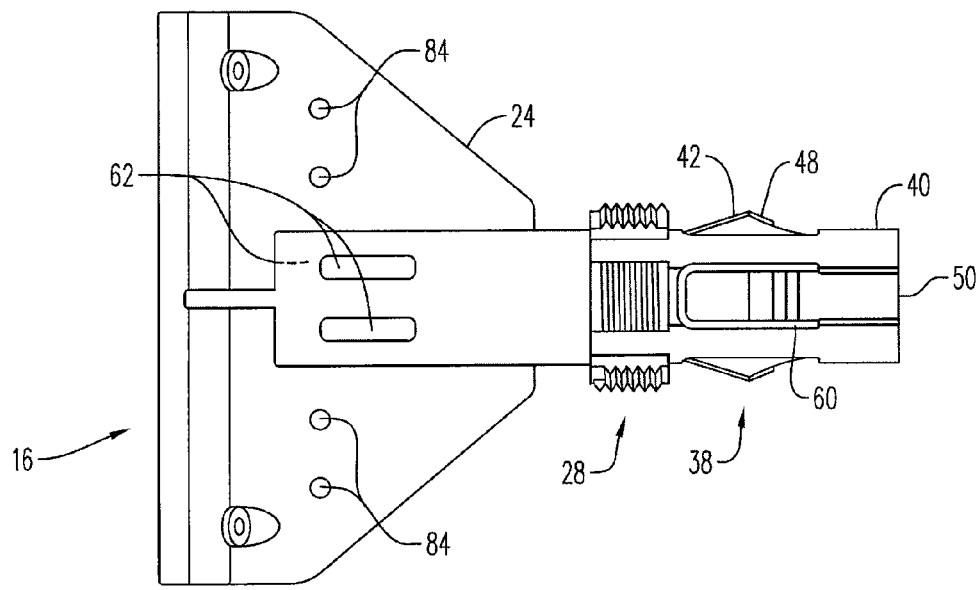
FIG. 7 is a top plan view of the socket connection of FIG. 3.
Figure 8:
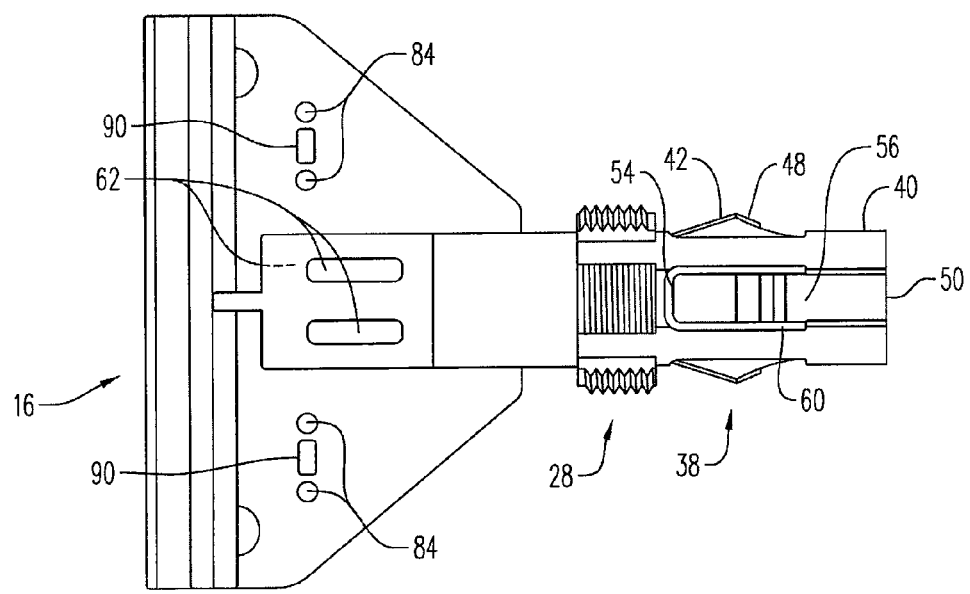
FIG. 8 is a bottom plan view of the socket connection of FIG. 3.
Figure 9:
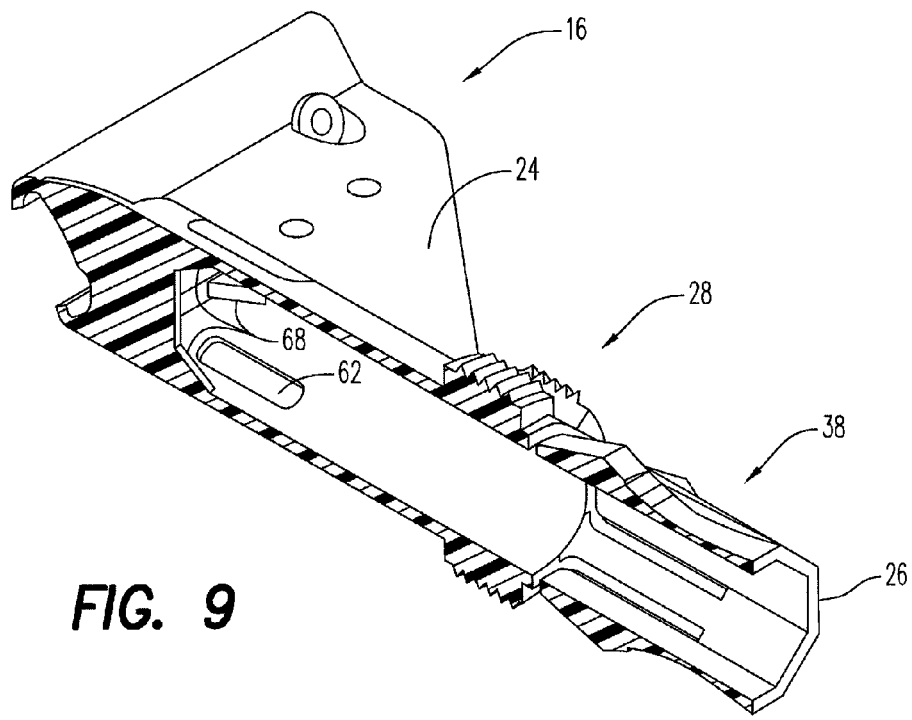
FIG. 9 is a sectional view of the socket connection taken along lines 9-9 in FIG. 3.

Openings 60 are formed at edges of the polygonal shape as best seen in FIGS. 7 and 8. It has been determined by the present disclosure that polygonal shape of handle receiving portion 26 and formation of openings 60 at edges of the polygonal shape ensure fluid communication between openings 60 and open regions 34, 44, which further provides a passageway for cleaning fluids between tightening member 18 and socket connection 16.

Moreover, the difference in the polygonal shape of socket connection 16 and the circular inner shape of tightening member 18 also provides a passageway for cleaning fluids between tightening member 18 and socket connection 16.

Many handles 14 with which connecting assembly 10 finds use have a generally circular outer shape. The difference in the polygonal shape of socket connection 16 and the circular outer shape of these handles also provides a passageway for cleaning fluids between socket connection 16 and handle 14.

In order to allow the escape of any fluid within inner conduit 52, socket connection 16 includes one or more drain openings 62 in handle receiving portion 26. Drain openings 62 can be formed in sides of handle receiving portion 26 and/or at the end of the handle receiving portion, which is best seen in FIG. 6.

In the illustrated embodiment, handle receiving portion 26 has a generally octagonal shape, providing eight flat sides, which allows for four threaded regions 32 and four clamping fingers 42, each one separated by a different open region 34, 44, respectively. Of course, it is contemplated by the present disclosure for socket connection 16 to have any polygonal shape with any number of sides with as few as three sides and as many as twenty sides being considered, or can be any shape configured to receive handle such as a spline-shape.

Connecting assembly 10 is configured as a universal connecting assembly that can find use with handles 14 having a variety of sizes and configurations, while ensuring that the handle is held to the connecting assembly. By way of example, connecting assembly 10 is configured for use with handles 14 have a variety of outer diameters such as from about 20 to about 30 millimeters (mm), with about 23 to about 28 mm being preferred, and any subranges therebetween.

In addition, many commercially available handles have an end feature 64 (FIGS. 1a through 1e) at the end of the handle that is secured within socket connection 16. End feature 64 can be a tapered end as in FIG. 1a, a flat end as in FIG. 1b, a tapered and threaded end as in FIG. 1c, an externally joined threaded end as in FIG. 1d, an internally joined threaded end as in FIG. 1e, or others. Connecting assembly 10 is also configured for use with handles 14 having end feature 64 with a variety of different lengths 66. By way of example, connecting assembly 10 is configured for use with handles 14 have an end feature length 66 up to about 90 mm.

Thus, connecting assembly 10 is advantageously configured as a universal connecting assembly that can find use with handles 14 having the variety of sizes and configurations such as those shown in FIGS. 1a through 1e, while ensuring that the handle is held to the connecting assembly.

In view of the above, socket connection 16 includes, in some embodiments, a plurality of radially disposed ramps 68 at the bottom of inner conduit 52. It has been found by the present disclosure that ramps 68 are effective at ensuring that the end of handle 14 having taper 64 remains centered at the bottom of inner conduit 52 regardless of the diameter of handle 14. Thus, ramps 68 are disclosed by way of example only. However, it is contemplated by the present disclosure for socket connection 16 to include any structure suitable to center handle 14 at the bottom of inner conduit 52 such as, but not limited to, concentric circles, springs, and others.

Other embodiments of socket connection 16 include an offset distance 70 between a top of ramp 68 and free end 54 of clamping fingers 42. It has been determined that offset distance 70 ensures that clamping fingers 42 clamp on handle 14 above taper 64 so that connecting assembly 10 is configured for use with a variety of handles. In some embodiments, offset distance 70 is at least about 70 mm, more preferably between about 80 mm and about 100 mm, with about 90 mm being most preferred.

As seen in FIGS. 10-11, inner cam surface 58 is a generally planar surface. However, it is also contemplated by the present disclosure for inner cam surface 58 to have a curvature.

Figure 12:
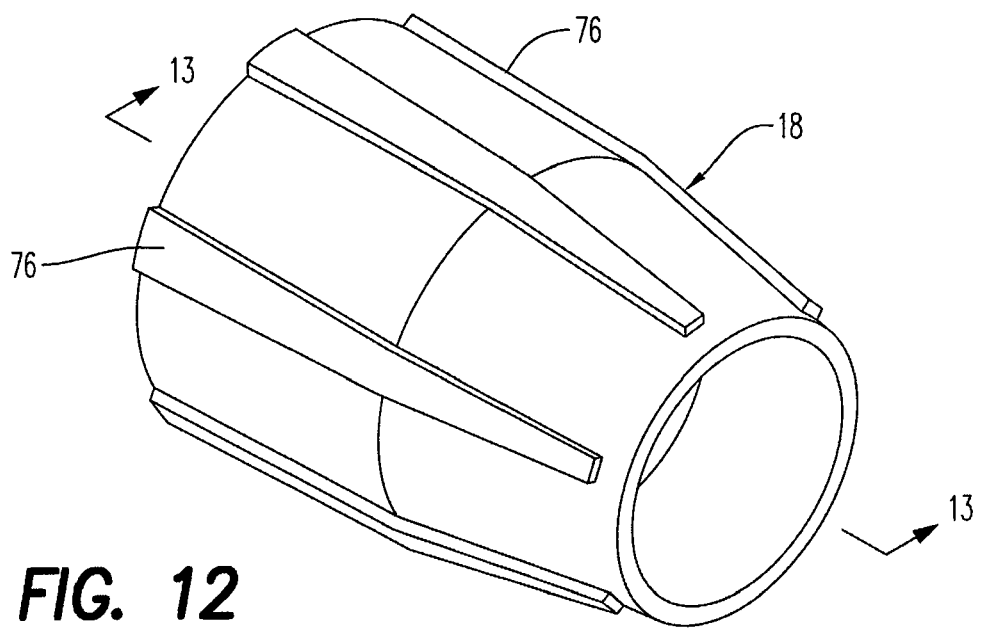
FIG. 12 is a front isometric view of an exemplary embodiment of a tightening member according to the present disclosure for use in the connection assembly of FIG. 1.
Figure 13:
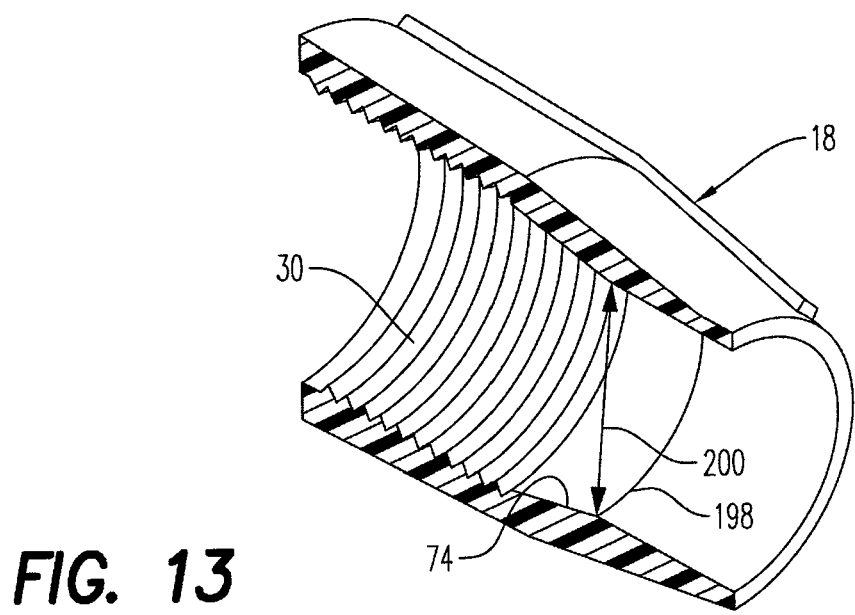
FIG. 13 is a sectional view of the tightening member of FIG. 12 taken along lines 13-13.

Tightening member 18 is described with more detail with respect to FIGS. 11-13. Tightening member 18 is formed of any material suitable to withstand the stress imparted to the tightening member during use. Preferably, tightening member 18 is formed of molded polymeric material such as, but not limited to, polypropylene, glass filled polypropylene, polyamide, glass filled polyamide, acetal, glass filled acetal, and others. Of course, it is also contemplated by the present disclosure for tightening member 18 to be formed of die cast metal, such as but not limited to, zinc, aluminum, magnesium, copper, tin, and alloys thereof.

In some embodiments where tightening member 18 is formed of molded polymer, the tightening member can include one or more anti-microbial components dispersed within and/or coated on the material from which the tightening member is formed. Examples of suitable antimicrobial components contemplated for use by the present disclosure include copper, silver, alloys of copper, alloys of silver, and combinations of any of the foregoing.

Tightening member 18 includes an inner cam surface 74 that cooperates with outer cam surface 48 of clamping fingers 42 in the manner discussed above.

In addition to threaded portion 30 and inner cam surface 74, tightening member 18 can include one or more gripping structures 76 on an outer periphery to assist the user during tightening and loosening of the member on the socket connection 16.

In some applications, it has been determined by the present disclosure that connecting assembly 10 may find use in a dedicated environment. For example, some cleaning protocols in restaurants require one cleaning device to be dedicated for cleaning the bathrooms, while other identical cleaning devices are dedicated to cleaning the kitchen. In this manner, cross contamination from the bathroom to the kitchen is avoided.

When using identical cleaning devices, it has been found by the present disclosure that a coding system can be used to distinguish the bathroom cleaning device from the kitchen cleaning device. For example, the bathroom cleaning device can be marked with one color or code, while the kitchen cleaning device can be marked with different color or code.

Advantageously, connecting assembly 10 can be configured to receive a coded marking device 78 shown in FIGS. 1-2 and 14-15. For example, coded marking device 78 includes a face portion 80 and one or more posts 82. Posts 82 are received in a corresponding number of holes 84 in tool receiving portion 24. Thus, in use, posts 82 of coded marking device 78 can be received in holes 80 of tool receiving portion 24 so that face portion 82 provides the user with an indication of where the cleaning device is to be used (e.g., bathroom or kitchen).

Preferably, tool receiving portion 24 includes a top face 86 and a rear face 88, where the rear face includes a feature 90 so that posts 82 of coded marking device 78 can only be inserted into holes 84 from the top face 88. In this manner, connecting assembly 10 assures that coded marking device 78 is visible in the normal working position of tool 12.

In some embodiments, posts 82 and/or holes 84 are configured so that coded marking device 78 is permanently secured to connecting assembly 10, namely so that the marking device 78 can not be removed from connecting assembly 10 after installation.

In other embodiments, posts 82 and/or holes 84 are configured so that coded marking device 78 is removably secured to connecting assembly 10, namely so that the marking device can be removed from connecting assembly 10 after installation.

In still other embodiments, coded marking device 78 is configured so that attempts to remove the coded marking device from connecting assembly 10 results in face portion 80 separating from posts 82, with posts 82 remaining secured in holes 84.

Advantageously, connecting assembly 10 can be sold in a kit with a plurality of different coded marking devices 78, allowing the user to secure the desired coded marking device 78 into the connecting assembly prior to first use as needed.

Figure 16:
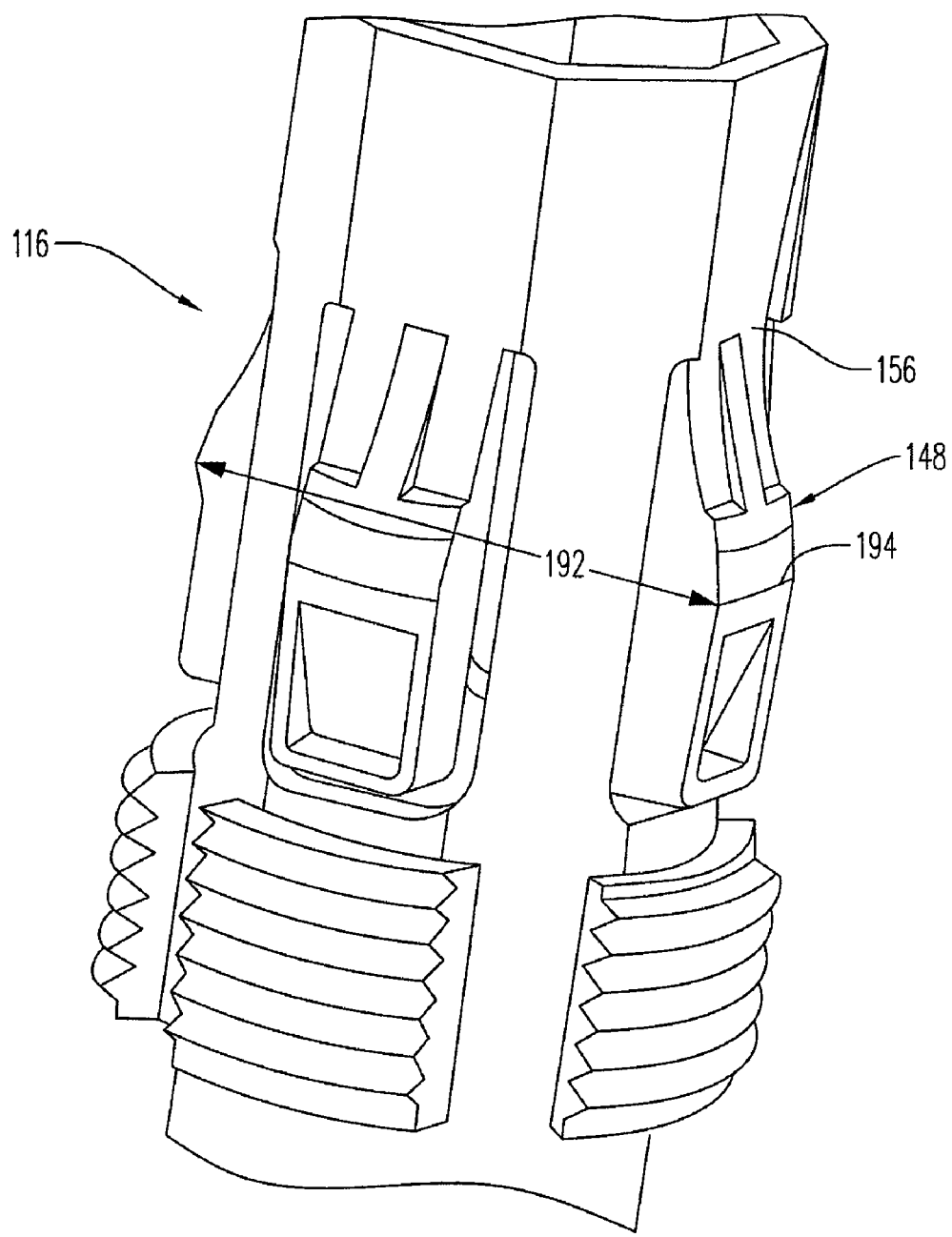
FIG. 16 is an isometric view of a socket connection for use with the connecting assembly of FIG. 1.

Referring now to FIG. 16, an alternate exemplary embodiment of a socket connection is shown and is generally referred to by reference numeral 116. Here, component parts performing similar or analogous functions to those of socket connection 16 are labeled in multiples of one hundred.

Socket connection 116 includes an outer cam surface 148 that interacts with tightening member 18 as the tightening member is threaded onto the socket connection to cause the clamping fingers to flex or bias radially inward towards handle 14 about hinged end 156 in the manner discussed above with respect to socket connection 16 shown in FIG. 11.

Outer cam surface 148 includes a maximum outer diameter 192 at an uppermost extent 194 of the outer cam surface and inner cam surface 74 (shown in FIG. 13) of tightening member 18 has an uppermost extent 198 with an inner diameter. Advantageously, outer cam surface 148 is configured so that, when tightening member 18 is engaged so that uppermost extent 194 of outer cam surface 148 interacts with uppermost extent 198 of inner cam surface 74 (shown in FIG. 13), maximum outer diameter 192 is substantially equal to inner diameter 200 of inner cam surface 74.

Referring to the drawings and in particular to FIGS. 17 through 20, an alternate exemplary embodiment of a connecting assembly according to the present disclosure is shown and is generally referred to by reference numeral 1010. Here, component parts performing similar and/or analogous functions to the prior embodiments are labeled in multiples on one thousand.

Connecting assembly 1010 is configured to secure a tool 1012 to a handle (not shown) with a simple structure that holds the handle in the connecting assembly so that the reach of the tool is extended. Connecting assembly 1010 includes a socket connection 1016 and a tightening member 1018 that cooperate to hold the handle in the assembly.

In this embodiment, socket connection 1016 includes a tool receiving portion 1024 and a handle receiving portion 1026, which can be integrally formed with one another or are separately formed, but secured to one another.

Handle receiving portion 1026 includes a threaded portion 1028 configured to threadably engage a corresponding threaded portion (not shown) of tightening member 1018. Threaded portion 1028 includes one or more threaded regions 1032 and one or more first open regions 1034 defined therein. In addition, threaded regions 1032 can include mold relief regions 1032a defined therein shown in FIG. 18.

Handle receiving portion 1026 also includes a clamping portion 1038, which cooperates with tightening member 1018 to form a clamped connection to the handle. Advantageously, clamping portion 1038 is configured in this embodiment as two separate pieces, which are joined to one another, allowing greater flexibility in material selection for the various components of the clamping portion.

Figure 17:
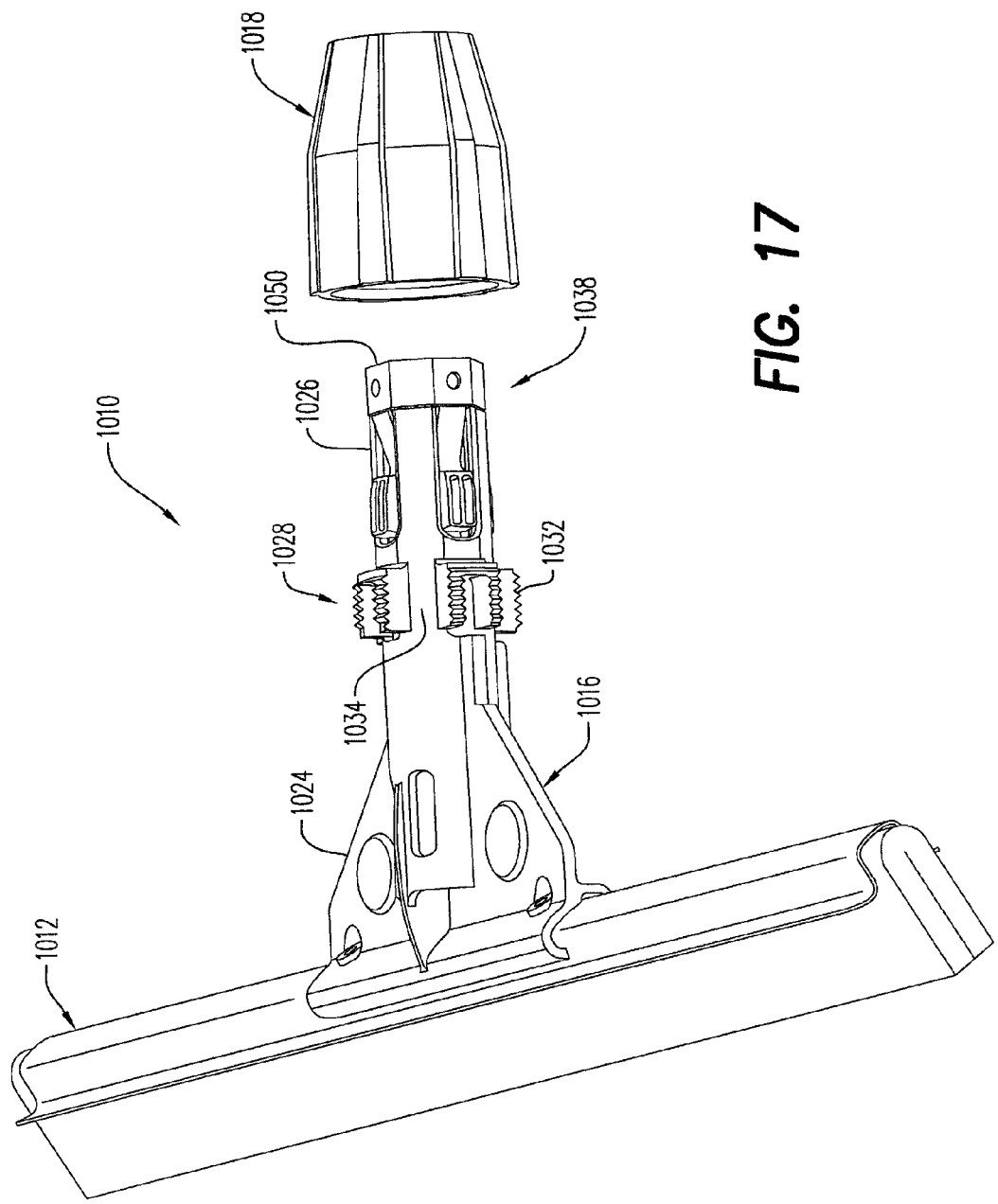
FIG. 17 is a rear isometric view of a connecting assembly according to an alternate exemplary embodiment of the present disclosure, shown in a partially disassembled state.

Clamping portion 1038 includes a plurality of clamping fingers 1042 secured to a finger section 1042a by a beam or web 1042c and one or more second open regions 1044. Finger section 1042a is separate from and connected to clamping portion 1038 so that fingers 1042 are received in openings defined in the clamping portion as seen in FIGS. 17 and 18.

Figure 18:
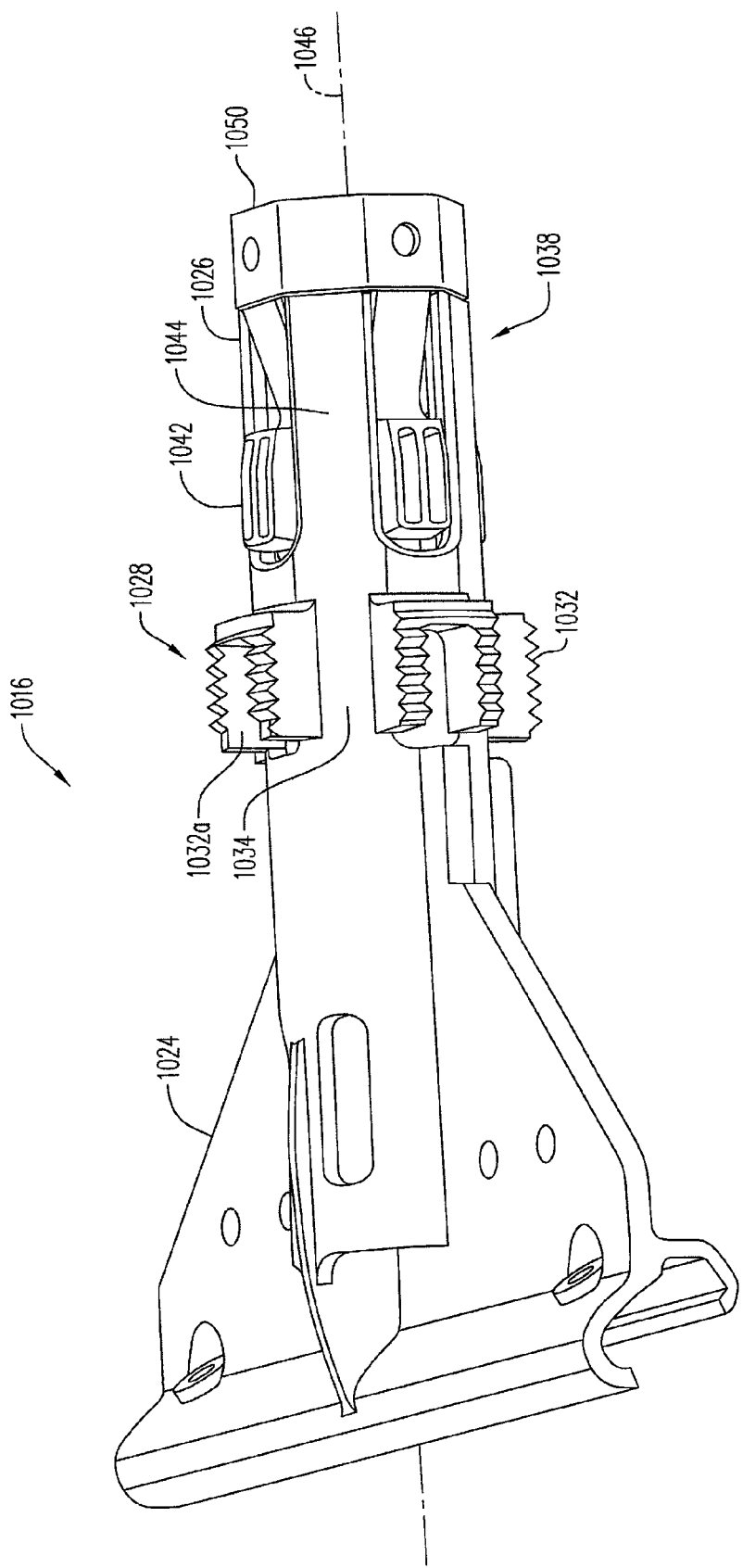
FIG. 18 is a rear isometric view of a socket connection for use with the connecting assembly of FIG. 17.

Threaded and clamping portions 1028, 1038 are disposed on socket connection 1016 so that threaded regions 1032 and clamping fingers 1042 are aligned with one another along a longitudinal axis 1046 of the socket connection and so that first and second open regions 1034, 1044 are aligned with one another along the longitudinal axis as best seen in FIG. 18, which provides a passageway for cleaning fluids between tightening member 1018 and socket connection 1016.

Handle receiving portion 1026 includes an open end 1050 defining an inner conduit, which receives the handle therein. Advantageously, clamping fingers 1042 have a free end 1054 that is remote from open end 1050 so that the fingers can be flexed, biased, or otherwise moved radially inward towards the handle under the influence of tightening member 1018 in the manner discussed in detail above.

In contrast to the embodiment discussed above with respect to FIG. 1, clamping fingers 1042 are, in some embodiments, normally biased to an inward or closed position. Upon receipt of the handle within socket connection 1016, the action of the handle on clamping fingers 1042 overcomes the natural elasticity or resilience of the clamping fingers to move the fingers radially outward.

In other embodiments, clamping fingers 1042 are simply hinged to finger section 1042a without any normal bias. Upon receipt of the handle within socket connection 1016, the action of the handle on clamping fingers 1042 moves the clamping fingers to move the fingers radially outward.

Advantageously, tightening member 1018 acts on a head area 1042b of clamping finger 1042 to force the head area against the handle.

Figure 19:
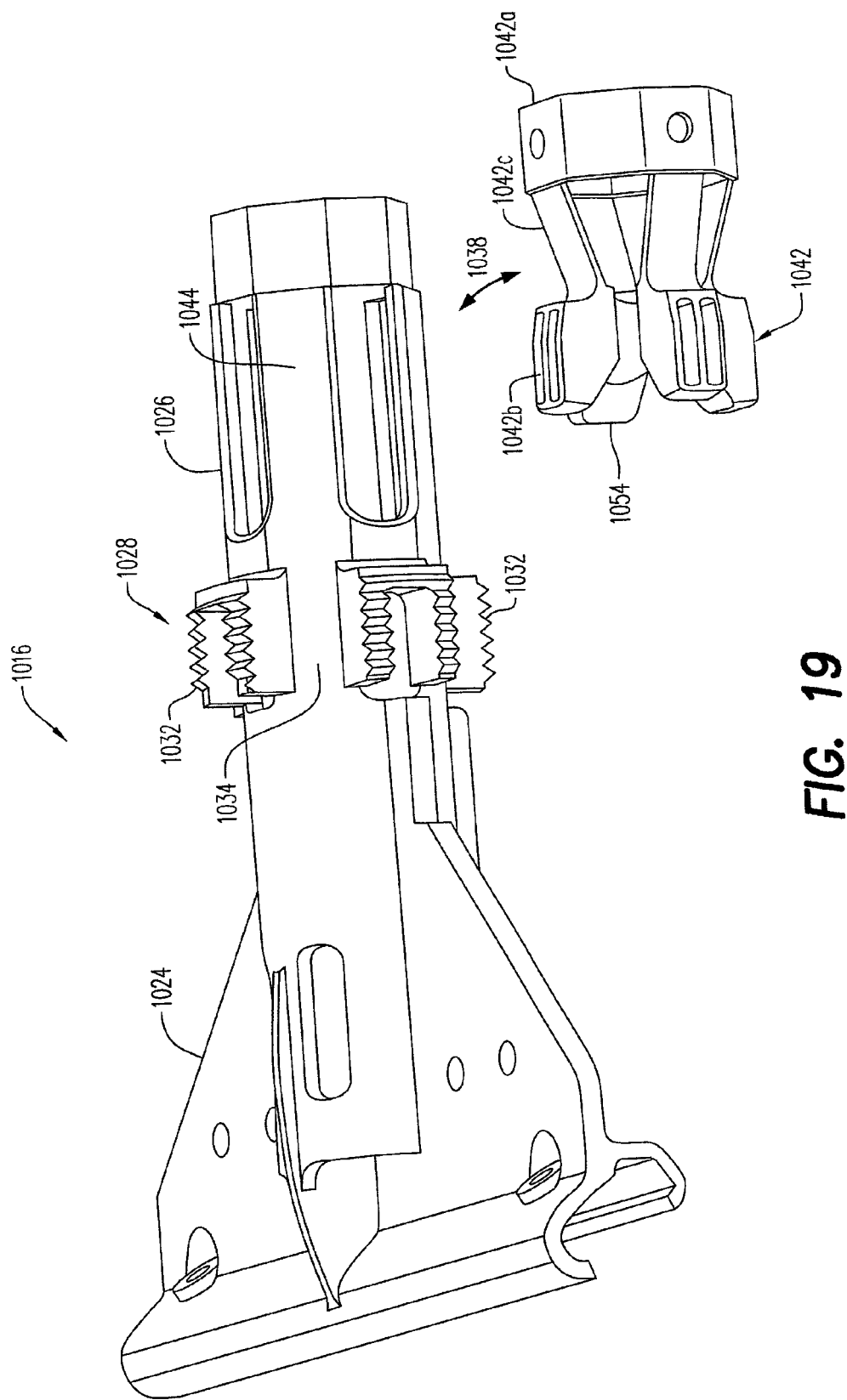
FIG. 19 is a rear isometric view of the socket connection of FIG. 18, shown in a disassembled state.
Figure 20:
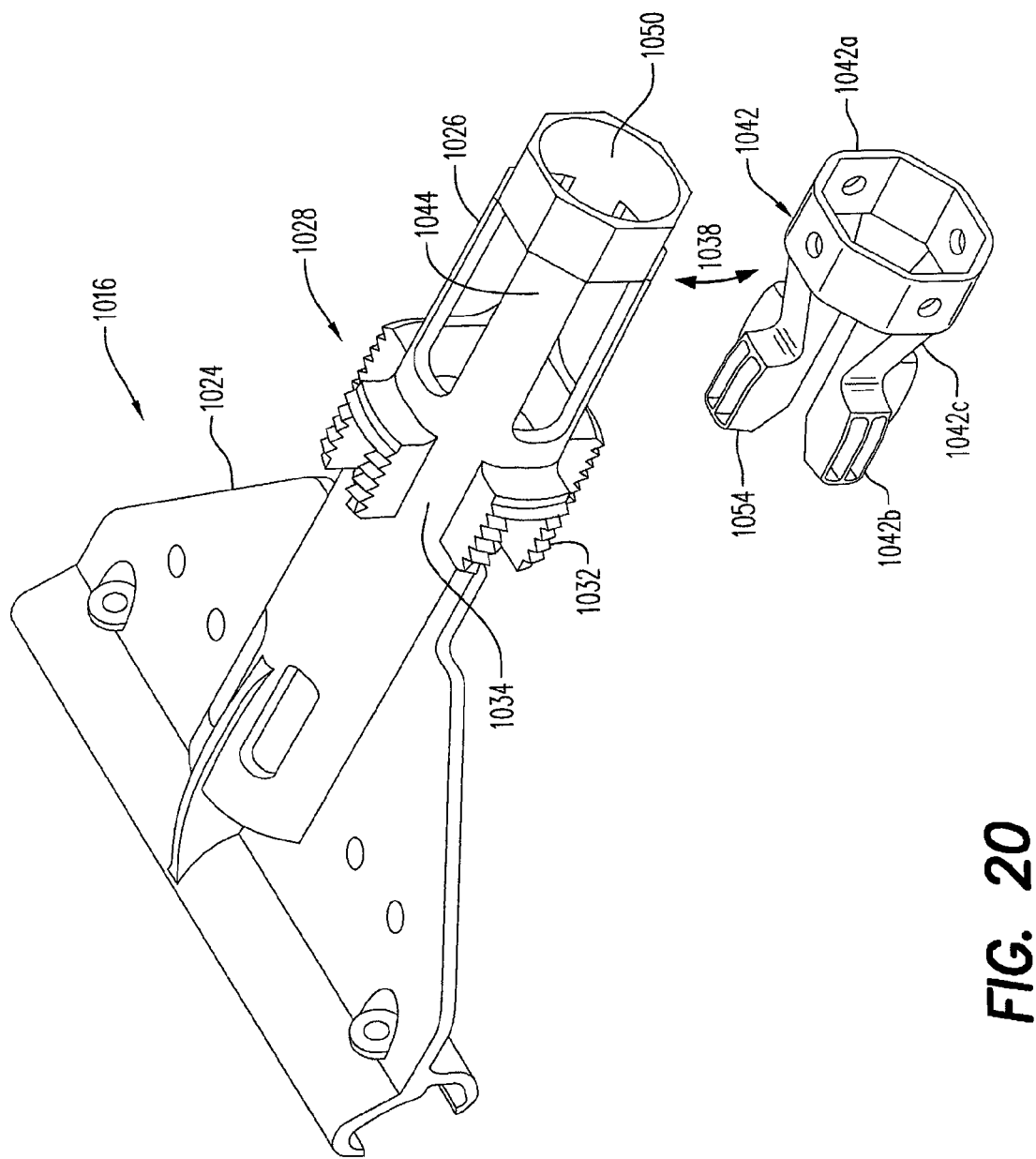
FIG. 20 is a front isometric view of the socket connection of FIG. 18, shown in the disassembled state.

Since tightening member 1018 acts on head area 1042b, it has been determined that any creep within a web portion 1042c of clamping finger 1042 does not have an effect on the performance of socket connection 1016 as best seen in FIG. 19.

For example, even if connecting assembly 1010 is stored and/or used for long periods of time in its locked or clamped position, namely where tightening member 1018 is threadably engaged with socket connection 1016 so that clamping fingers 1042 are clamped onto the handle, any creep or set induced web portion 1042c of clamping finger 1042 in an inwardly biased position does not affect the interaction of tightening member 1018 on head area 1042b to secure the handle therein.

More specifically, tightening member 1018 includes an inner cam surface that interacts with an outer cam surface 1048 on head area 1042b as the tightening member is threaded onto socket connection 1016 to cause the head area to move radially inward towards the handle. In this manner, tightening member 1018 directly contacts head area 1042b, while the head area directly contacts the handle. This direct contact results in a high retention force between head area 1042b and the handle and does not rely on the flexion of web 1042c of clamping fingers 1042. As a result, web 1042c only functions as a hinge to locate head area 1042b in relation to tightening member 1018 and, even if there is creep in the web, the contact will still occur in the correct place creating the high level of retention between the handle and the clamping fingers.

Further, even if web portion 1042c creeps radially inward, socket connection 1016 includes clamping fingers 1042 where free ends 1054 are remote from open end 1050 so that insertion of the handle into open end 1050 results in clamping fingers 1042 being pushed radially outwards so that socket connection 1016 remains able to accommodate handles of differing diameters regardless of the existence of creep in the socket connection.

Accordingly, connecting assembly 1010 is also configured as a universal connecting assembly that can find use with handles having a variety of sizes and configurations, while ensuring that the handle is held to the connecting assembly.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A connecting assembly comprising:
   a tool receiving portion;
   a handle receiving portion having a first threaded portion, a clamping portion, and a longitudinal axis, said first threaded portion including a plurality of threaded regions separated by a plurality of first open regions, said handle receiving portion, at least in the region of said first threaded portion and said clamping portion, having a polygonal cross-sectional shape defined by a plurality of flat outer surfaces; and
   a tightening member having a second threaded portion enagable with said first threaded portion so that said tightening member can cause said clamping portion to secure a handle in said handle receiving portion,
   wherein said clamping portion has a plurality of clamping fingers separated by a plurality of second open regions, said first and second open regions being aligned with one another along said longitudinal axis to provide a passageway for cleaning fluids between said tightening member and said clamping portion when engaged with one another, said plurality of flat outer surfaces providing increased volume to said passageway.

2. The connecting assembly of claim 1, wherein each clamping finger of said plurality of clamping fingers comprises a hinged end formed at a respective one of said plurality of flat outer surfaces.

3. The connecting assembly of claim 2, wherein each clamping finger of said plurality of clamping fingers further comprises a free end, said hinged end being proximate, along said longitudinal axis, to said handle receiving portion and said free end being proximate, along said longitudinal axis, to said tool receiving portion.

4. The connecting assembly of claim 3, wherein said handle receiving portion further comprises an upper guide structure at an open end of said handle receiving portion.

5. The connecting assembly of claim 1, wherein said plurality of clamping fingers are normally biased radially outward, normally biased radially inward, or hinged without any normal bias.

6. The connecting assembly of claim 1, further comprising a coded marking device secured to said tool receiving portion.

7. The connecting assembly of claim 1, wherein said tool and handle receiving portions are molded of a material selected from the group consisting of polypropylene, glass filled polypropylene, polyamide, glass filled polyamide, acetal, and glass filled acetal.

8. The connecting assembly of claim 7, further comprising one or more anti-microbial components dispersed within and/or coated on said material.

9. The connecting assembly of claim 1, wherein said clamping portion further comprises a finger section, said finger section comprising said plurality of fingers, said finger section being separate from but connected to said clamping portion so that said plurality of clamping fingers extend through openings defined in said clamping portion.

10. The connecting assembly of claim 9, wherein said finger section comprises a metal selected from the group consisting of zinc, aluminum, magnesium, copper, tin, and alloys thereof.

11. A connecting assembly comprising:
a tool receiving portion;
a handle receiving portion having a first threaded portion, a clamping portion having a plurality of clamping fingers, and a longitudinal axis, said handle receiving portion, at least in the region of said first threaded portion and said clamping portion, having a polygonal cross-sectional shape defined by a plurality of flat outer surfaces; and
a tightening member having a second threaded portion enagable with said first threaded portion so that said tightening member can cause said clamping portion to secure a handle in said handle receiving portion, wherein each clamping finger of said plurality of clamping fingers comprises a hinged end formed at a respective one of said plurality of flat outer surfaces.

12. The connecting assembly of claim 11, wherein each clamping finger of said plurality of clamping fingers further comprises a free end, said hinged end being proximate, along said longitudinal axis, to said handle receiving portion and said free end being proximate, along said longitudinal axis, to said tool receiving portion.

13. The connecting assembly of claim 12, wherein said handle receiving portion further comprises an upper guide structure at an open end of said handle receiving portion.

14. The connecting assembly of claim 11, wherein said first threaded portion comprises a plurality of threaded regions separated by a plurality of first open regions and said plurality of clamping fingers are separated by a plurality of second open regions, said first and second open regions being aligned with one another along said longitudinal axis to provide a passageway for cleaning fluids between said tightening member and said clamping portion when engaged with one another, said plurality of flat outer surfaces providing increased volume to said passageway.

15. The connecting assembly of claim 11, wherein said clamping portion further comprises a finger section that is separate from but connected to said clamping portion so that said plurality of clamping fingers extend through openings defined in said clamping portion.

16. A connecting assembly comprising:
a tool receiving portion;
a handle receiving portion having an open end to receive a handle, a first threaded portion, a clamping portion, and a longitudinal axis; and
a tightening member having a second threaded portion enagable with said first threaded portion so that said tightening member can cause said clamping portion to secure the handle in said handle receiving portion,
said clamping portion comprising a plurality of clamping fingers having a hinged end and a free end, said handle receiving portion having, at least in the region of said clamping portion, a polygonal cross-sectional shape defined by a plurality of flat outer surfaces, said hinged end of each clamping finger being formed at a respective one of said plurality of flat outer surfaces.

17. The connecting assembly of claim 16, wherein said hinged end is proximate, along said longitudinal axis, to said opening of said handle receiving portion and said free end is proximate, along said longitudinal axis, to said tool receiving portion.

18. The connecting assembly of claim 16, wherein said handle receiving portion further comprises an upper guide structure at said open end of said handle receiving portion.

19. The connecting assembly of claim 16, wherein said first threaded portion comprises a plurality of threaded regions separated by a plurality of first open regions and said plurality of clamping fingers are separated by a plurality of second open regions, said first and second open regions being aligned with one another along said longitudinal axis to provide a passageway for cleaning fluids between said tightening member and said clamping portion when engaged with one another, said plurality of flat outer surfaces providing increased volume to said passageway.

20. The connecting assembly of claim 16, wherein said clamping portion further comprises a finger section, said finger section comprising said plurality of fingers, said finger section being separate from but connected to said clamping portion so that said plurality of clamping fingers extend through openings defined in said clamping portion.

* * * * *